US011935457B1

(12) United States Patent
He et al.

(10) Patent No.: US 11,935,457 B1

(45) Date of Patent: Mar. 19, 2024

(54) METHODS OF DRIVING A DISPLAY PANEL CAPABLE FLICKERING PROBLEM AND DISPLAY MODULES THEREOF

(71) Applicant: Shenzhen China Star Optoelectronics Semiconductor Display Technology Co., Ltd., Shenzhen (CN)

(72) Inventors: Jhenwei He, Shenzhen (CN); Jianyu Liu, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/308,710

(22) Filed: Apr. 28, 2023

(30) Foreign Application Priority Data

Dec. 26, 2022 (CN) ........................ 202211678653.6

(51) Int. Cl.

| | |
|---|---|
| ***G09G 3/30*** | (2006.01) |
| ***G09G 3/20*** | (2006.01) |
| ***G09G 3/36*** | (2006.01) |

(52) U.S. Cl.

CPC ......... *G09G 3/2074* (2013.01); *G09G 3/2096* (2013.01); *G09G 2300/0452* (2013.01); *G09G 2300/0823* (2013.01); *G09G 2320/0233* (2013.01); *G09G 2320/0247* (2013.01); *G09G 2320/028* (2013.01); *G09G 2320/045* (2013.01); *G09G 2340/04* (2013.01)

(58) Field of Classification Search

CPC ............... G09G 3/2074; G09G 3/2096; G09G 2300/0452; G09G 2300/0823; G09G 2320/0249

See application file for complete search history.

(56) References Cited

U.S. PATENT DOCUMENTS

| | | | | |
|---|---|---|---|---|
| 2006/0238472 A1* | 10/2006 | Lee | G09G 3/3688 | 345/89 |
| 2014/0002431 A1* | 1/2014 | Shibata | G09G 3/3648 | 345/87 |
| 2021/0280120 A1* | 9/2021 | Zhang | G09G 3/3688 | |

* cited by examiner

*Primary Examiner* — Sanghyuk Park

(74) *Attorney, Agent, or Firm* — Nathan & Associates; Menachem Nathan

(57) ABSTRACT

A method of driving a display panel includes: driving a plurality of sub-pixels of a plurality of sub-pixel groups to display in a plurality of frames. In each of the sub-pixel groups in each frame, a number of the sub-pixels with high gray-scale data compensation status and the positive polarity is equal to a number of the sub-pixels with the high gray-scale data compensation status and the negative polarity, a ratio of a number of the sub-pixels with the high gray-scale data compensation status to a number of the sub-pixels with low gray-scale data compensation status is 1:m, where m is an integer greater than 1.

15 Claims, 3 Drawing Sheets

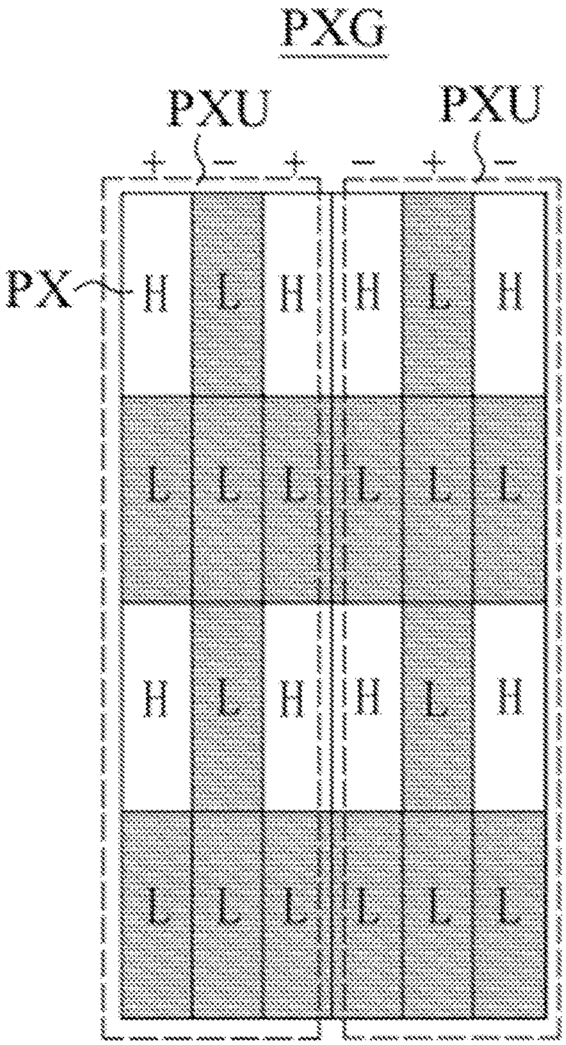

FIG. 4

Driving the sub -pixels of the plurality of sub -pixel groups to display in a plurality of frames, wherein in each of the sub -pixel groups in each of the frames, a number of the sub-pixels with high gray -scale data compensation status and positive polarity is equal to a number of the sub -pixels with the high gray -scale data compensation status and negative polarity , and a ratio of a number of the sub -pixels with the high gray -scale data compensation status to a number of the sub-pixels with low gray -scale data compensation status is 1: m, where m is an integer greater than 1

S1

FIG. 5

METHODS OF DRIVING A DISPLAY PANEL CAPABLE FLICKERING PROBLEM AND DISPLAY MODULES THEREOF

CROSS-REFERENCE TO RELATED APPLICATION

This application claims priority to Chinese Patent Application No. 202211678653.6, filed on Dec. 26, 2022, the disclosure of which is incorporated herein by reference in its entirety.

TECHNICAL FIELD

The present disclosure relates to display technologies, in particular to methods of driving a display panel and display modules.

BACKGROUND

For a display panel, an improved resolution with its size unchanged may result in reduction in an aperture ratio, thereby reducing the transmittance of the display panel. In order to match the display panel with the improved resolution, 4-Domain pixel architecture is used in the related art. However, the 4-Domain pixel architecture has led to deterioration of viewing angle characteristics, and it is necessary to improve the viewing angle characteristics through a viewing angle compensation algorithm.

With the viewing angle compensation algorithm, high gray-scale compensation data and low gray-scale compensation data are used to compensate for display in two adjacent sub-pixel areas to realize a relatively high gray-scale and a relatively low gray-scale that replace an original gray-scale of a pixel. Its luminance relationship satisfies: a luminance corresponding to the original gray-scale being equal to arithmetic mean of a luminance corresponding to the relatively high gray-scale and a luminance corresponding to the relatively low gray-scale, ensuring that a relationship between a luminance and a gray-scale at a front viewing angle remains unchanged, and correcting a relationship between a luminance and a gray-scale at a side viewing angle.

Compensation status for a sub-pixel include a high gray-scale data compensation status (indicated by "H") and a low gray-scale data compensation status (indicated by "L"). In the related art, when displaying a frame of image, H: L is designed to be 1:1. However, it has been found that a display panel with this design still have a small viewing angle. If a ratio of H:L is increased rashly, it is easy to cause a flickering problem due to asymmetry of polarities of the sub-pixels.

SUMMARY

In view of the above, an embodiment of the present disclosure provides a method of driving a display panel, the display panel including a plurality of sub-pixel groups, each of the sub-pixel groups including a plurality of sub-pixels arranged in a row direction and a column direction, the driving method including:

- driving the sub-pixels of the plurality of sub-pixel groups to display in a plurality of frames,
- wherein in each of the sub-pixel groups in each of the frames, a number of the sub-pixels with high gray-scale data compensation status and the positive polarity is equal to a number of the sub-pixels with the high gray-scale data compensation status and the negative polarity, and a ratio of a number of the sub-pixels with the high gray-scale data compensation status to a number of the sub-pixels with low gray-scale data compensation status is 1:m, where m is an integer greater than 1.

An embodiment of the present disclosure further provides a display module, including: a display panel including a plurality of sub-pixel groups, each of the sub-pixel groups including a plurality of sub-pixels arranged in a row direction and a column direction; and a driver chip configured to execute program instructions to realize the driving method as defined above.

BRIEF DESCRIPTION OF THE DRAWINGS

FIG. 4 is a schematic diagram of a display status of sub-pixels of a display panel according to an embodiment of the present disclosure.

FIG. 5 is a schematic flowchart of a method of driving a display panel according to an embodiment of the present disclosure.

DETAILED DESCRIPTION

Figure 1:
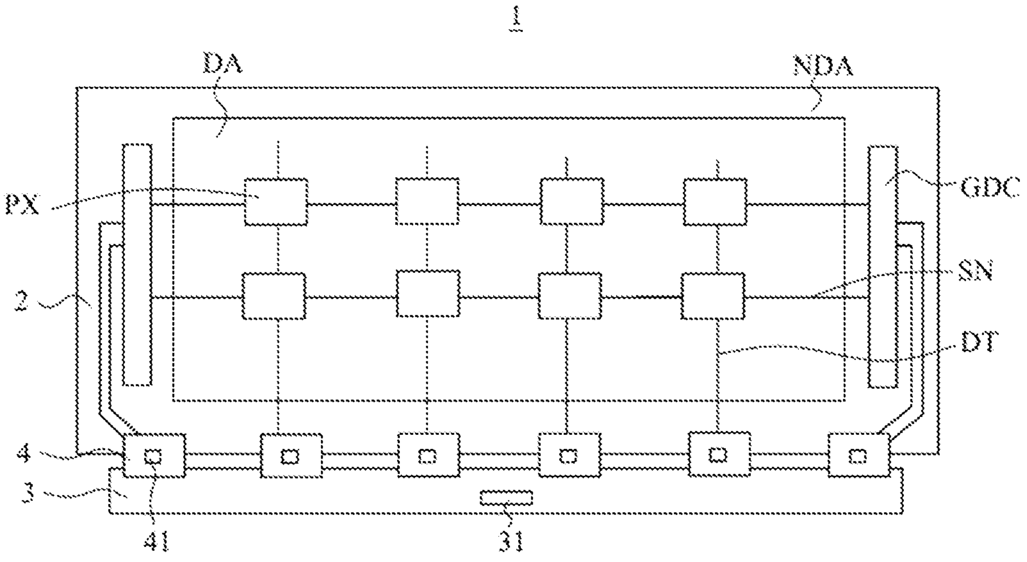
FIG. 1 is a schematic structural diagram of a display module according to an embodiment of the present disclosure.

Some embodiments of the present disclosure will be described in detail below with reference to the drawings. It should be understood that the described embodiments are only to illustrate and explain the present disclosure, but not intended to limit the present disclosure. In the present disclosure, unless stated to the contrary, the terms such as "up" and "down" usually refer to up and down in the actual use or working status of the device, specifically the direction of the drawing in the drawings; while "inside" and "outside" refer to the outline of the device.

As shown in FIG. 1, an embodiment of the present disclosure provides a display module 1. The display module 1 may include a display panel 2, a circuit board 3, and a chip on film (COF) 4. The display panel 2 may be a liquid crystal display (LCD) panel. The circuit board 3 may be a printed circuit board (PCB). The COF 4 may be a flexible circuit board.

The display panel 2 includes a display area DA and a non-display area NDA. The display area DA may be an area where sub-pixels PX for displaying images are disposed. The non-display area NDA may be an area for setting driving units providing driving signals for the sub-pixels PX and some lines connected to the driving units, such as power lines. The non-display area NDA may be disposed on at least one side of the display area DA. The non-display area NDA may at least partially surround the circumference of the display area DA.

The display panel 2 includes a plurality of sub-pixels PX, a plurality of data lines DT, a plurality of scan lines SN, and a gate driving circuit GDC. The plurality of sub-pixels PX are located in the display area DA and arranged in an array to form a plurality of rows and columns of the sub-pixels. The gate driving circuit GDC is located in the non-display area NDA, and drives the plurality of rows of the sub-pixels PX through the plurality of scan lines SN to turn on the plurality of rows of the sub-pixels PX row by row. At a same time, the plurality of data lines DT sequentially load data signals to the plurality of rows of the sub-pixels PX, so that the display panel 2 displays a complete frame of images within one frame.

The COF 4 includes a source driver chip 41 for transmitting the data signals to the plurality of data lines DT.

The circuit board 3 includes a timing control chip 31. The timing control chip 31 is electrically connected to the source driver chip 41 and the gate driver circuit GDC to control a timing thereof.

Figure 2:
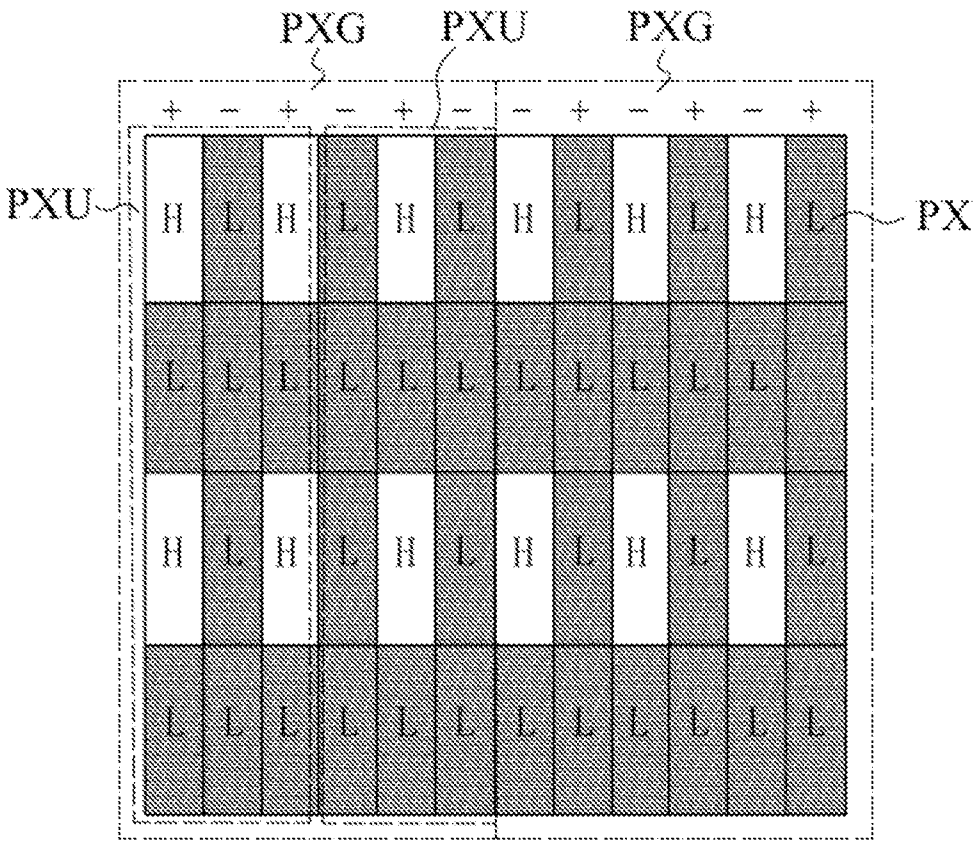
FIG. 2 is a schematic diagram of a display status of sub-pixels of a display panel according to an embodiment of the present disclosure.
Figure 3:
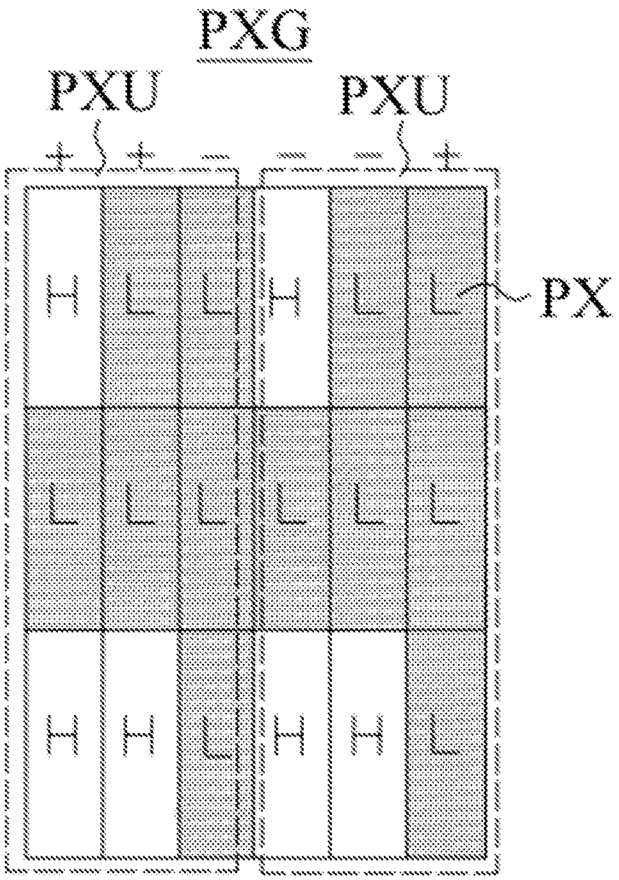
FIG. 3 is a schematic diagram of a display status of sub-pixels of a display panel according to an embodiment of the present disclosure.

As shown in FIGS. 2-4, the plurality of sub-pixels PX form a plurality of sub-pixel groups PXG. Each of the sub-pixel groups PXG includes a plurality of sub-pixels PX arranged along a row direction and a column direction.

In some embodiments of the present disclosure, as shown in FIG. 2, in each of the sub-pixel groups PXG in each of the frames, a number of the sub-pixels PX with high gray-scale data compensation status (indicated by "H") and the positive polarity (indicated by "+") is equal to a number of the sub-pixels PX with the high gray-scale data compensation status and the negative polarity (indicated by "−"). A ratio of a number of the sub-pixels PX with the high gray-scale data compensation status to a number of the sub-pixels PX with low gray-scale data compensation status (indicated by "L") is 1:m, and m is an integer greater than 1. Exemplarily, m=3. Therefore, a traditional design of H:L=1:1 is broken through by increasing a proportion of the sub-pixels PX with the low gray-scale data compensation status, which can further improve the viewing angle characteristics of the display panel. At the same time, a design of H+:H−=1:1 can make polarities of the sub-pixels PX with the high gray-scale data compensation status symmetrical and improve a phenomenon of flickering.

Each of the sub-pixel groups PXG includes 2n sub-pixel units PXU arranged in the row direction, and n is a positive integer. Each of the sub-pixel units PXU includes three sub-pixel columns being arranged in the row direction and having different display colors respectively. That is, each of the sub-pixel groups PXG includes 6n sub-pixel columns. Exemplarily, n=1. Three columns of sub-pixels display red, green, and blue, respectively.

In 6n sub-pixel columns of each of the sub-pixel groups PXG, 6n sub-pixel columns of each of the sub-pixel groups alternately have first compensation status and second compensation status. Two adjacent sub-pixels in a sub-pixel column having the first compensation status alternately have the high gray-scale data compensation status (indicated by "H") and the low gray-scale data compensation status (indicated by "L"). Each of the sub-pixels PX in each sub-pixel column having the second compensation status has the low gray-scale data compensation status (indicated by "L"). Therefore, a design of H:L=1:3 in each of the sub-pixel groups PXG can be realized. Moreover, the sub-pixels PX with the high gray-scale data compensation status (indicated by "H") are surrounded by the sub-pixels PX with the low gray-scale data compensation status (indicated by "L"), and an improvement effect of the viewing angle is good. In addition, the plurality of rows of sub-pixels PX all have the low gray-scale data compensation status (indicated by "L"), which is convenient for driving.

In each of the sub-pixel groups PXG, polarities of a plurality of sub-pixels PX of every two adjacent ones of the sub-pixel groups PXU are opposite. Exemplarily, the polarities of the plurality of sub-pixels PX of the adjacent two sub-pixel units PXU are (+−+)(−+−) in sequence. Therefore, the polarities of the sub-pixels PX of the sub-pixel group PXG can be made more uniform. Moreover, in the same one of the sub-pixel groups PXG, the polarities of the sub-pixel columns in which the sub-pixels PX are all in the low gray-scale data compensation status is designed to be reversed, which can significantly improve flicker.

Along the row direction, polarities of every two adjacent ones of the sub-pixel groups PXG are opposite. Exemplarily, the polarities of the adjacent two sub-pixel groups PXG are (+−+−+−)(−+−+−+) in sequence. Therefore, the polarities of the plurality of sub-pixel groups PXG can be made more uniform. Of course, the polarities of the adjacent two sub-pixel groups PXG can also be (+++−+−), (−−−+−+), or (++++++)(−−−−−−).

In some embodiments of the present disclosure, as shown in FIG. 3, in a same one of the sub-pixel groups PXG in a same frame, a number of the sub-pixels PX with the high gray-scale data compensation status (indicated by "H") and the positive polarity (indicated by "+") is equal to a number of the sub-pixels PX with the high gray-scale data compensation status (indicated by "H") and the negative polarity (indicated by "−"). A number of the sub-pixels PX with the low gray-scale data compensation status (indicated by "L") and the positive polarity (indicated by "+") is equal to a number of the sub-pixels PX with the low gray-scale data compensation status (indicated by "L") and the negative polarity (indicated by "−"). A ratio of a number of the sub-pixels PX with the high gray-scale data compensation status (indicated by "H") to a number of the sub-pixels PX with the low gray-scale data compensation status (indicated by "L") is 1:m, and m is an integer greater than 1, and m=3.

Each of the sub-pixel groups PXG includes 2n sub-pixel units PXU arranged in the row direction, and n is a positive integer. Each of the sub-pixel units PXU includes three sub-pixel columns being arranged in the row direction and having different display colors respectively. That is, each of the sub-pixel groups PXG includes 6n sub-pixel columns. Exemplarily, n=1. Three columns of sub-pixels display red, green, and blue, respectively.

In a same one of the sub-pixel units PXU, quantities of the sub-pixels PX with the low gray-scale data compensation status of at least two sub-pixel columns are different. Exemplarily, in each of the sub-pixel units, the three sub-pixel columns respectively include gradually increasing numbers of the sub-pixels with the low gray-scale data compensation status. Therefore, by gradually adjusting the proportion of the sub-pixels PX with the low gray-scale data compensation status in the sub-pixel unit PXU, the display brightness of adjacent sub-pixel columns changes evenly, and the display effect can be further optimized.

Among the three sub-pixel columns of each of the sub-pixel units PXU, the plurality of sub-pixels PX in a first column sequentially have the high gray-scale data compensation status (indicated by "H"), the low gray-scale data compensation status (indicated by "L"), and the high gray-scale data compensation status (indicated by "H"), or the low gray-scale data compensation status (indicated by "L"), the high gray-scale data compensation status (indicated by "H"), and the low gray-scale data compensation status (indicated by "L"). The plurality of sub-pixels PX in a second column sequentially have the low gray-scale data compensation status (indicated by "L"), the low gray-scale data compensation status (indicated by "L"), and the high gray-scale data compensation status (indicated by "H"), or the high gray-scale data compensation status (indicated by "H"), the low gray-scale data compensation status (indicated by "L"), and the low gray-scale data compensation status (indicated by "L"). The plurality of sub-pixels in a third column sequentially have the low gray-scale data compensation status (indicated by "L"), the low gray-scale data compensation status (indicated by "L"), and the low gray-scale data compensation status (indicated by "L").

Exemplarily, in the three sub-pixel columns of each of the sub-pixel units PXU, a plurality of sub-pixels PX in a first column of the three sub-pixel columns sequentially have the high gray-scale data compensation status (indicated by "H"), the low gray-scale data compensation status (indicated by "L"), and the high gray-scale data compensation status (indicated by "H"). That is, the first column of the three sub-pixel columns includes one sub-pixel PX with the low gray-scale data compensation status. A plurality of sub-pixels PX in a second column of the three sub-pixel columns sequentially have the low gray-scale data compensation status (indicated by "L"), the low gray-scale data compensation status (indicated by "L"), and the high gray-scale data compensation status (indicated by "H"). That is, the second column of the three sub-pixel columns includes two sub-pixels PX with the low gray-scale data compensation status. A plurality of sub-pixels PX in a third column of the three sub-pixel columns sequentially have the low gray-scale data compensation status (indicated by "L"), the low gray-scale data compensation status (indicated by "L"), and the low gray-scale data compensation status (indicated by "L"). That is, the third column of the three sub-pixel columns includes three sub-pixels PX with the low gray-scale data compensation status.

In a same one of the sub-pixel groups PXG, polarities of a plurality of sub-pixels PX of every two adjacent ones of the sub-pixel groups PXU are opposite. Exemplarily, the polarities of the plurality of sub-pixels PX of the adjacent two sub-pixel units PXU are (++−)(−−+) in sequence. Therefore, the polarities of the sub-pixels PX of the sub-pixel group PXG can be made more uniform. Moreover, in the same one of the sub-pixel groups PXG, the polarities of the sub-pixel columns in which the sub-pixels PX are all in the low gray-scale data compensation status is designed to be reversed, which can significantly improve flicker.

Along the row direction, polarities of every two adjacent ones of the sub-pixel groups PXG are opposite. Exemplarily, the polarities of the adjacent two sub-pixel groups PXG are (+−+−+−)(−+−+−+) in sequence. Therefore, the polarities of the plurality of sub-pixel groups PXG can be made more uniform. Of course, the polarities of the adjacent two sub-pixel groups PXG can also be (+++−+−), (−−−+−+), or (++++++)(−−−− −−).

In some embodiments of the present disclosure, polarities of a plurality of sub-pixels PX of every two adjacent ones of the sub-pixel groups PXU may not be opposite (not shown in figures). For example, for the sub-pixel columns whose sub-pixels PX are all in the low gray-scale data compensation status, their polarities can be designed to be the same. Exemplarily, the polarities of the plurality of sub-pixels PX of the adjacent two sub-pixel units PXU are (++−)(−−−) in sequence. Therefore, in a sub-pixel group PXG adjacent to the sub-pixel group PXG, the sub-pixels PX are all sub-pixel columns with the low gray-scale data compensation status, and their polarities need to be designed to be opposite, so as to maintain polarity balance between the adjacent two sub-pixel groups PXG.

Each of the sub-pixel groups PXG includes 2n sub-pixel units PXU arranged in the row direction, and n is a positive integer. Each of the sub-pixel units PXU includes three sub-pixel columns being arranged in the row direction and having different display colors respectively. That is, each of the sub-pixel groups PXG includes 6n sub-pixel columns. Exemplarily, n=1. Three columns of sub-pixels display red, green, and blue, respectively.

In each of the sub-pixel units PXU, three adjacent sub-pixel columns alternately have a first compensation status, a second compensation status, and the first compensation status. Two adjacent sub-pixels PX in a sub-pixel column having the first compensation status alternately have the high gray-scale data compensation status (indicated by "H") and the low gray-scale data compensation status (indicated by "L"). The sub-pixels PX in a sub-pixel column having the second compensation status are all in the low gray-scale data compensation status (indicated by "L"). Therefore, a design of H:L=1:2 in each of the sub-pixel groups PXG can be realized. Moreover, the plurality of rows of sub-pixels PX all have a low gray-scale data compensation status (indicated by "L"), which is convenient for driving.

In a same one of the sub-pixel groups PXG, polarities of a plurality of sub-pixels PX of every two adjacent ones of the sub-pixel groups PXU are opposite. Exemplarily, the polarities of the plurality of sub-pixels PX of the adjacent two sub-pixel units PXU are (+−+)(−+−) in sequence. Therefore, the polarities of the sub-pixels PX of the sub-pixel group PXG can be made more uniform. Moreover, in the same one of the sub-pixel groups PXG, the polarities of the sub-pixel columns in which the sub-pixels PX are all in the low gray-scale data compensation status is designed to be reversed, which can significantly improve flicker.

Along the row direction, polarities of every two adjacent ones of the sub-pixel groups PXG are opposite. Exemplarily, the polarities of the adjacent two sub-pixel groups PXG are (+−+−+−)(−+−+−+) in sequence. Therefore, the polarities of the plurality of sub-pixel groups PXG can be made more uniform. Of course, the polarities of the adjacent two sub-pixel groups PXG can also be (+++−+−), (−−−+−+), or (++++++)(−−−−−−).

In some embodiments of the present disclosure, a number of the sub-pixels PX with the low gray-scale data compensation status (indicated by "L") and the positive polarity (indicated by +) is equal to a number of the sub-pixels PX with the low gray-scale data compensation status (indicated by "L") and the negative polarity (indicated by −). Therefore, polarities of the sub-pixels PX with the high gray-scale data compensation status can be made symmetrical, and the phenomenon of flickering can be improved.

Please refer to FIG. 5, the embodiments of the present disclosure also provides a method of driving a display panel, which is applied to the display module 1 as described above to drive the display panel 2. The driving method can be executed by the source driver chip 41 or the timing control chip 31. The driving method includes:

step S1, driving the plurality of sub-pixels PX of the plurality of sub-pixel groups PXG to display in a plurality of frames;

wherein in a same one of the sub-pixel groups PXG in a same frame, a number of the sub-pixels PX with a high gray-scale data compensation status and the positive polarity is equal to a number of the sub-pixels PX with the high gray-scale data compensation status and the negative polarity, a ratio of a number of the sub-pixels PX with the high gray-scale data compensation status to a number of the sub-pixels PX with a low gray-scale data compensation status is 1:m, and m is an integer greater than 1.

At an interval of p frames, respective polarities of the sub-pixels PX of the plurality of sub-pixel groups PXG are reversed, and p is a positive integer, such as 1, 2, and 3. Therefore, polar symmetry in the time dimension can be achieved.

Some embodiments of the present disclosure have been introduced in detail above. The description of the embodiments is merely intended to help understand the principles and core ideas of the present disclosure. Those skilled in the art may make various modifications based on the present disclosure. Thus, the contents of the present specification should not be construed as limitations to the present disclosure.

What is claimed is:

1. A method of driving a display panel, the display panel comprising a plurality of sub-pixel groups, each of the sub-pixel groups comprising a plurality of sub-pixels arranged in a row direction and in a column direction, the method comprising:

driving the sub-pixels of the plurality of sub-pixel groups to display in a plurality of frames, wherein in each of the sub-pixel groups in each of the frames, a number of the sub-pixels with high gray-scale data compensation status and the positive polarity is equal to a number of the sub-pixels with the high gray-scale data compensation status and the negative polarity, and a ratio of a number of the sub-pixels with the high gray-scale data compensation status to a number of the sub-pixels with low gray-scale data compensation status is 1:m, where m is an integer greater than 1;

wherein each of the sub-pixel groups comprises 2n sub-pixel units arranged in the row direction, and each of the sub-pixel units comprises three sub-pixel columns being arranged in the row direction and having different display colors respectively, where n is a positive integer; and wherein in each of the sub-pixel units, the three sub-pixel columns respectively include gradually increasing numbers of the sub-pixels with the low gray-scale data compensation status.

2. The method according to claim 1, wherein m=3.

3. The method according to claim 1, wherein 6n sub-pixel columns of each of the sub-pixel groups alternately have first compensation status and second compensation status, in which the sub-pixels in each sub-pixel column having the first compensation status alternately have the high gray-scale data compensation status and the low gray-scale data compensation status and each of the sub-pixels in each sub-pixel column having the second compensation status has the low gray-scale data compensation status.

4. The method according to claim 3, wherein every two adjacent ones of the sub-pixel groups in the row direction have opposite polarities respectively.

5. The method according to claim 3, wherein in each of the sub-pixel groups, every two adjacent ones of the sub-pixel units in the row direction have opposite polarities respectively.

6. The method according to claim 1, wherein the sub-pixels having the low gray-scale data compensation status are disposed around the sub-pixels having the high gray-scale data compensation status.

7. The method according to claim 1, wherein among the three sub-pixel columns of each of the sub-pixel units, the sub-pixels in a first column sequentially have the high gray-scale data compensation status, the low gray-scale data compensation status, and the high gray-scale data compensation status, or sequentially have the low gray-scale data compensation status, the high gray-scale data compensation status, and the low gray-scale data compensation status, the sub-pixels in a second column sequentially have the low gray-scale data compensation status, the low gray-scale data compensation status, and the high gray-scale data compensation status, or sequentially have the high gray-scale data compensation status, the low gray-scale data compensation status, and the low gray-scale data compensation status, and each of the sub-pixels in a third column has the low gray-scale data compensation status.

8. The method according to claim 7, wherein every two adjacent ones of the sub-pixel groups in the row direction have opposite polarities respectively.

9. The method according to claim 7, wherein in each of the sub-pixel groups, every two adjacent ones of the sub-pixel units in the row direction have opposite polarities respectively.

10. The method according to claim 1, wherein at an interval of p frames of the plurality of frames, respective polarities of the sub-pixels of the plurality of sub-pixel groups are reversed, where p is a positive integer.

11. The method according to claim 1, wherein in each of the frames, a number of the sub-pixels with the low gray-scale data compensation status and the positive polarity is equal to a number of the sub-pixels with the low gray-scale data compensation status and the negative polarity.

12. The method according to claim 1, wherein m=2.

13. The method according to claim 12, wherein each of the sub-pixel groups comprises 2n sub-pixel units arranged in the row direction, and each of the sub-pixel units comprises three sub-pixel columns being arranged in the row direction and having different display colors respectively, where n is a positive integer.

14. The method according to claim 13, wherein the three adjacent sub-pixel columns in each of the sub-pixel units respectively have a first compensation status, a second compensation status, and the first compensation status, in which the sub-pixels in each sub-pixel column having the first compensation status alternately have the high gray-scale data compensation status and the low gray-scale data compensation status and each of the sub-pixels in each sub-pixel column having the second compensation status has the low gray-scale data compensation status.

15. A display module, comprising:

a display panel comprising a plurality of sub-pixel groups, each of the sub-pixel groups comprising a plurality of sub-pixels arranged in a row direction and in a column direction; and a driver chip configured to execute program instructions to realize a method for driving the display panel, the method comprising:

driving the sub-pixels of the plurality of sub-pixel groups to display in a plurality of frames, wherein in each of the sub-pixel groups in each of the frames, a number of the sub-pixels with high gray-scale data compensation status and the positive polarity is equal to a number of the sub-pixels with the high gray-scale data compensation status and the negative polarity, and a ratio of a number of the sub-pixels with the high gray-scale data compensation status to a number of the sub-pixels with low gray-scale data compensation status is 1:m, where m is an integer greater than 1;

wherein each of the sub-pixel groups comprises 2n sub-pixel units arranged in the row direction, and each of the sub-pixel units comprises three sub-pixel columns being arranged in the row direction and having different display colors respectively, where n is a positive integer; and wherein in each of the sub-pixel units, the three sub-pixel columns respectively include gradually increasing numbers of the sub-pixels with the low gray-scale data compensation status.

* * * * *